United States Patent
Brenner et al.

(10) Patent No.: US 10,658,695 B2
(45) Date of Patent: May 19, 2020

(54) BATTERY HAVING A PRISMATIC METAL HOUSING

(71) Applicant: VARTA Microbattery GmbH, Ellwangen Jagst (DE)

(72) Inventors: Rolf Brenner, Ellwangen (DE); Juergen Ernsperger, Neuler (DE)

(73) Assignee: VARTA Microbattery GmbH, Ellwangen Jagst (DE)

( * ) Notice: Subject to any disclaimer, the term of this patent is extended or adjusted under 35 U.S.C. 154(b) by 150 days.

(21) Appl. No.: 15/567,245

(22) PCT Filed: Mar. 18, 2016

(86) PCT No.: PCT/EP2016/056014
§ 371 (c)(1),
(2) Date: Oct. 17, 2017

(87) PCT Pub. No.: WO2016/165911
PCT Pub. Date: Oct. 20, 2016

(65) Prior Publication Data
US 2018/0108934 A1    Apr. 19, 2018

(30) Foreign Application Priority Data
Apr. 17, 2015  (DE) .................. 10 2015 207 070

(51) Int. Cl.
*H01M 10/04*    (2006.01)
*H01M 2/02*     (2006.01)
(Continued)

(52) U.S. Cl.
CPC ....... *H01M 10/0431* (2013.01); *H01M 2/024* (2013.01); *H01M 2/027* (2013.01);
(Continued)

(58) Field of Classification Search
CPC .. H01M 10/0431; H01M 10/045; H01M 2/30; H01M 2/0217; H01M 2/22;
(Continued)

(56) References Cited

U.S. PATENT DOCUMENTS

| | | | |
|---|---|---|---|
| 2005/0225926 A1 | 10/2005 | Erhardt et al. | |
| 2007/0117009 A1* | 5/2007 | Yamauchi | H01M 2/263 429/160 |

(Continued)

FOREIGN PATENT DOCUMENTS

| | | | | |
|---|---|---|---|---|
| CN | 101931105 | * | 12/2010 | ............ H01M 10/38 |
| CN | 101931105 A | | 12/2010 | |

(Continued)

OTHER PUBLICATIONS

Machine translations of CN 101931105, Chuntai et al., 2010 (Year: 2010).*

*Primary Examiner* — Maria Laios
*Assistant Examiner* — Kwang Han
(74) *Attorney, Agent, or Firm* — DLA Piper LLP (US)

(57) ABSTRACT

A battery has a prismatic metal housing that includes a rectangular base having a base inner side and a base outer side, a rectangular cover having a cover inner side and a cover outer side, the size and shape of which substantially correspond to that of the base, and four rectangular side elements connecting the base and the cover and each have an inner side and an outer side. The at least one individual cell is a winding having a first and a second end face and the first end face faces in the direction of the base and the second end face faces in the direction of the cover. Conductor vanes electrically connect to the base of the metal housing exit from the first end face. These are fixed to an electrically (Continued)

conductive collecting and positioning means inserted into a receiving means in the base of the metal housing and fixed therein.

18 Claims, 2 Drawing Sheets

(51) Int. Cl.
  *H01M 2/30* (2006.01)
  *H01M 2/22* (2006.01)
  *H01M 2/26* (2006.01)
  *H01M 10/0587* (2010.01)

(52) U.S. Cl.
  CPC ........... *H01M 2/0217* (2013.01); *H01M 2/22* (2013.01); *H01M 2/30* (2013.01); *H01M 2/263* (2013.01); *H01M 10/0587* (2013.01)

(58) Field of Classification Search
  CPC .. H01M 2/027; H01M 2/024; H01M 10/0587; H01M 2/263
  See application file for complete search history.

(56) References Cited

U.S. PATENT DOCUMENTS

| | | | |
|---|---|---|---|
| 2009/0162747 A1* | 6/2009 | Zhu | H01M 10/615 429/160 |
| 2011/0052976 A1 | 3/2011 | Ishii et al. | |
| 2015/0111090 A1* | 4/2015 | Lee | H01M 4/78 429/163 |

FOREIGN PATENT DOCUMENTS

| | | |
|---|---|---|
| DE | 100 47 206 A1 | 6/2002 |
| DE | 202 04 027 U1 | 6/2002 |
| DE | 10 2010 035 580 A1 | 3/2011 |
| JP | 2000-90977 A | 3/2000 |

* cited by examiner

BATTERY HAVING A PRISMATIC METAL HOUSING

TECHNICAL FIELD

This disclosure relates to a battery having a prismatic metal housing.

BACKGROUND

The term "battery" originally referred to a plurality of galvanic cells connected in series. Today, however, individual galvanic cells (individual cells) are also frequently known as a battery. During the discharge of a galvanic cell, an energy-providing chemical reaction takes place, which is composed of two electrically mutually coupled, but spatially mutually separate, partial reactions. Electrons are released in an oxidation process at the negative electrode, resulting in an electron current, via an external load, to the positive electrode which receives a corresponding number of electrons. A reduction process therefore takes place at the positive electrode. At the same time, an ion current corresponding to the electrode reaction is established within the cell. This ion current is ensured by an ion conducting electrolyte. In secondary cells and batteries, this discharge reaction is reversible. It is, therefore, possible to reverse the conversion of chemical energy into electrical energy which has taken place during the discharge.

Among known secondary batteries, comparatively high energy densities are achieved in particular in lithium-ion batteries, i.e. in batteries in which lithium ions migrate from one electrode to the other during the charge and discharge processes. A lithium-ion battery comprises at least one individual cell having at least one positive and at least one negative electrode. In particular, it can comprise an individual cell in the form of a winding.

In many cases, the at least one individual cell of a lithium-ion battery is inserted into the interior of a prismatic metal housing. The metal housing is normally composed of a receptacle having a rectangular housing base and four side walls arranged at a right angle thereto and a housing cover that substantially has the same shape and size as the housing base. In other words, it is preferably cuboidal. The housing cover is generally barely profiled and can be described as virtually flat. The metal housing is usually closed in that the edges of the housing cover are welded to the opening edge of the receptacle.

To contact an electrical load located outside the housing, the battery usually comprises at least one contact pole to which the load can be connected. A metal component arranged on an outer side of the housing usually serves as a contact pole.

The battery can comprise two contact poles, of which one (the so-called positive contact pole) connects to the at least one positive electrode via a first pole stud electrically insulated from the metal housing and the other (the so-called negative contact pole) connects to the at least one negative electrode via a second pole stud electrically insulated from the metal housing. However, it is also possible for the metal housing itself to function as a positive or negative contact pole or at least as an electrical bridge between one of the contact poles and the at least one positive or the at least one negative electrode. In this case, the housing has to be electrically connected to the at least one positive electrode or the at least one negative electrode. To this end, an electrical contact between a current conductor belonging to the electrode to be connected and the side of the housing base facing into the housing interior is preferably formed by welding.

In particular, if the battery comprises an individual cell in the form of a winding, this leads to structural problems. Typically, such a winding has a first and a second flat end face and a circumferential casing connecting the two end faces, wherein respective current conductors (so-called "conductor vanes"), via which current can flow from and to the electrodes, exit from the first and the second end face. For obvious reasons, conductor vanes of opposite polarity are spatially separate from one another. Conductor vanes of different polarity preferably also exit at different end faces, for example, conductor vanes connected to the at least one positive electrode at the first end face and conductor vanes connected to the at least one negative electrode at the second end face.

Since the conductor vanes exiting from an end face of such a winding have to be welded to the side of the housing base facing into the housing interior before the winding is inserted into the metal housing, it is necessary either to opt for very long conductor vanes or to extend them by a welded-on conductor. When the winding is inserted into the metal housing following the welding procedure, the conductor vanes or extensions have to be folded and laid against the base. The dead volume inside the metal housing that cannot be used for electrode material is thus increased.

It could therefore be helpful to provide batteries, in particular lithium-ion batteries, having a prismatic metal housing.

SUMMARY

We provide a battery including a prismatic metal housing having a housing inner side and a housing outer side, at least one individual cell having at least one positive and at least one negative electrode arranged inside the metal housing, and a pole stud electrically connected to the at least one positive or the at least one negative electrode and electrically insulated from the metal housing and to which an electrical load arranged outside the housing can be connected, wherein the metal housing includes a rectangular base having a base inner side and a base outer side, a rectangular cover having a cover inner side and a cover outer side, the size and shape of which substantially correspond to that of the base, and four rectangular side elements connecting the base and the cover and each have an inner side and an outer side, the cover has a through-hole through which the pole stud which is electrically insulated from the metal housing is guided outward from the inside of the metal housing, the at least one individual cell is a winding having a first and a second end face and the first end face faces in the direction of the base and the second end face faces in the direction of the cover, conductor vanes electrically connected to the base of the metal housing exit from the first end face, conductor vanes electrically connected to the pole stud, which is electrically insulated from the metal housing, exit from the second end face, the conductor vanes exiting from the first end face are fixed to an electrically conductive collecting and positioning means, and the base has a receiving means for the collecting and positioning means, in which the latter is inserted and fixed.

We also provide a method of manufacturing a battery including providing an individual cell having at least one positive and at least one negative electrode in the form of a winding having a first and a second end face, wherein conductor vanes connected to the positive electrode exit from the first end face and conductor vanes connected to the negative electrode exit from the second end face, arranging a collecting and positioning means on one of the end faces of the winding and fixing the conductor vanes exiting from this end face in or on the collecting and positioning means, providing a receptacle having a rectangular base and four side elements arranged at a right angle thereto, whereof the free edges form an opening, wherein the base has a receiving means for the collecting and positioning means, in which the latter can be inserted and fixed, inserting the winding with the end face provided with the collecting and positioning means first into the receptacle until the collecting and positioning means reaches the base and is inserted into the receiving means, fixing the collecting and positioning means in the receiving means, and closing the opening with a rectangular cover.

DETAILED DESCRIPTION

Figure 1:
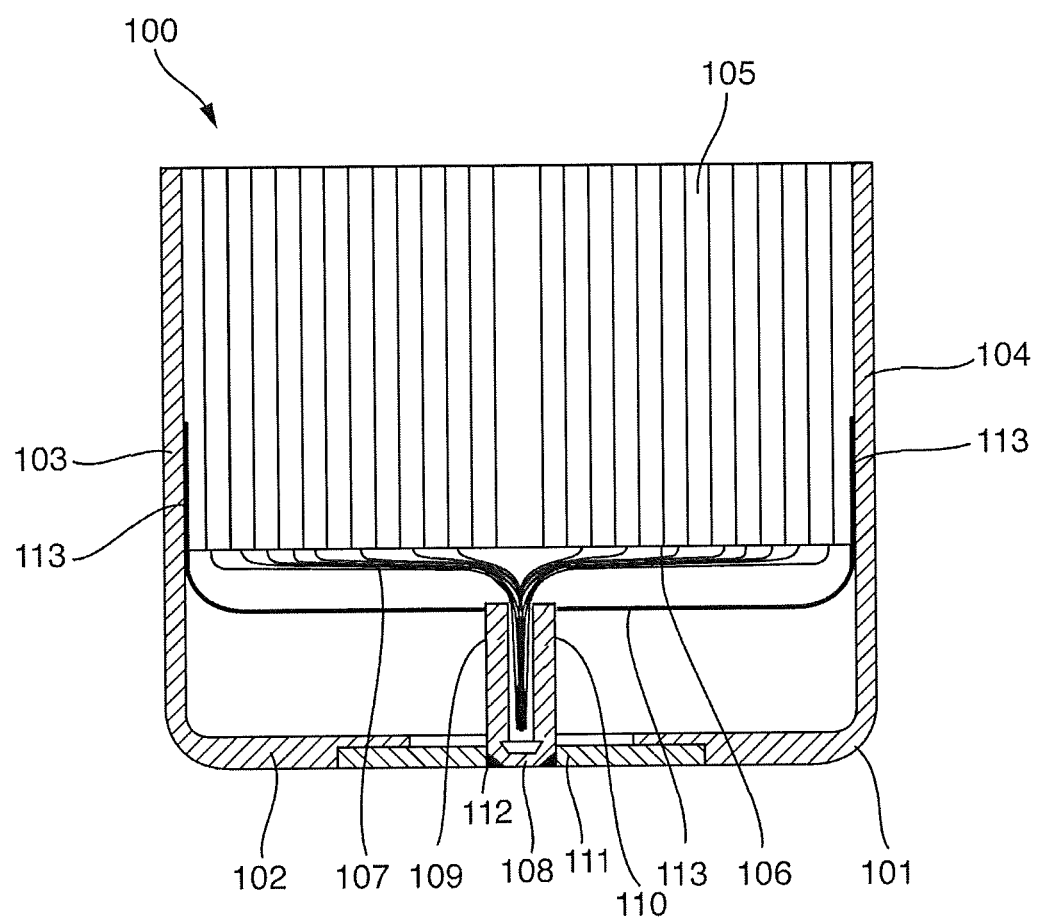
FIG. 1 shows a schematic illustration of a cross-section of the base region of an example of a battery 100.

We provide a battery having a prismatic metal housing having a housing inner side and a housing outer side. The housing shields the at least one individual cell from its environment and is preferably designed to be gas- and fluid-tight.

At least one individual cell having at least one positive and at least one negative electrode is arranged inside the metal housing. The individual cell is preferably a lithium-ion based cell. Correspondingly, the battery is preferably a lithium-ion battery.

The individual cell is preferably in the form of a composite of electrode and separator foils with the sequence positive electrode/separator/negative electrode. The electrodes preferably comprise metal current collectors, usually in the form of two- or three-dimensional planar structures. In lithium-ion batteries, a grid or foil of aluminum, for example, of aluminum expanded metal or a perforated aluminum foil, is located for instance on the side of the positive electrode. Grids or foils of copper are usually used as current collectors on the side of the negative electrode.

The battery comprises a pole stud electrically connected to the at least one positive or the at least one negative electrode and is electrically insulated from the metal housing and to which an electrical load arranged outside the metal housing can be connected. This pole stud is preferably made from a metal such as copper. The electrical insulation between the pole stud and the metal housing can be, for example, an insulating mass such as that described in DE 100 47 206 A1 or a plastics foil.

The metal housing of the battery preferably comprises a rectangular base having a base inner side and a base outer side and a rectangular cover having a cover inner side and a cover outer side, the size and shape of which substantially correspond to that of the base. The metal housing furthermore preferably comprises four rectangular side elements that connect the base and the cover and each have an inner side and an outer side. The base and the cover are preferably aligned parallel to one another. The base and the cover and the side elements preferably each enclose a right angle with all directly adjacent side elements. The housing is therefore preferably formed as a cuboid.

During assembly, the metal housing is preferably composed of a receptacle comprising the base and the side elements and a matching cover. To this end, the cover is generally welded to the side elements.

The side elements and the base and the cover of the metal housing preferably have a substantially uniform and constant thickness over their entire surface. The thickness is, for example, 0.3 mm to 3 mm.

The cover of the metal housing preferably has a through-hole through which the pole stud which is electrically insulated from the metal housing is guided outward from the inside of the metal housing. Preferably, a part of the pole stud located outside the housing forms a contact pole or is in electrical contact with a separate contact pole.

The battery can essentially contain both a cell stack (stack) comprising a plurality of flat individual cells and one or more wound individual cells (coil). However, it particularly preferably comprises an individual cell in the form of a winding having a first and a second end face. The end faces are preferably aligned flat and parallel to one another. They are connected via a circumferential casing.

It is preferred that the winding is arranged inside the metal housing such that the first end face faces in the direction of the base and the second end face faces in the direction of the cover. The end faces, the base and the cover are preferably all aligned parallel to one another.

It is preferred that conductor vanes electrically connected to the base of the metal housing exit from the first end face, while conductor vanes electrically connected to the pole stud, which is electrically insulated from the metal housing, exit from the second end face. As in the batteries discussed at the outset, current can flow from and to the electrodes via the conductor vanes. For this purpose, the conductor vanes are preferably electrically connect to the aforementioned current collectors in the electrodes. Preferably, the conductor vanes can also be parts of the current collectors not covered by electrode material.

It is preferred that the conductor vanes are made from the same material as the current collectors.

The conductor vanes exiting from the first end face are particularly preferably fixed to an electrically conductive collecting and positioning means while, at the same time, the base has a receiving means for the collecting and positioning means, in which the latter is inserted and fixed.

The collecting and positioning means serves to group or collect the conductor vanes exiting from the first end face. Preferably, the collecting and positioning means is, or comprises, a metal clamping rail in which the conductor vanes are fixed. The clamping rail can have, for example, two clamping limbs between which the conductor vanes are fixed, which clamping limbs extend parallel to one another and connect to one another via a yoke. The conductor vanes can preferably be welded to the clamping limbs for fixing purposes.

On the other hand, the collecting and positioning means can be helpful to position the winding inside the metal housing, in particular facilitating the positioning of the winding on the base of the metal housing.

Preferably, the collecting and positioning means are first arranged on the first end face of the winding, preferably in a central position, and the conductor vanes are fixed on or in the collecting and positioning means, in particular by welding. In a subsequent step, the winding is inserted—with the first end face first—into a receptacle having a rectangular base and four side elements arranged at a right angle thereto, until the collecting and positioning means reach the base. The desired position of the winding on the base is realized by the positioning of the receiving means, which is matched to the collecting and positioning means in terms of shape and size. Once inserted into the receiving means, the collecting and positioning means can be fixed therein, for example by welding it to the base.

Preferably, the base has a through-hole as a receiving means for the collecting and positioning means. The advantage of this technical measure is apparent. The collecting and positioning means is also accessible from outside the metal housing through the through-hole. Therefore, for example, the collecting and positioning means can be welded to the base after the metal housing has already been closed by placing a cover thereon. In particular, use of the long or extended conductor vanes and, therefore, the hitherto necessary folding thereof, is also unnecessary.

Preferably, the conductor vanes exiting from the first end face connect to the positive electrode and the conductor vanes exiting from the second end face connect to the negative electrode. In other words, the metal housing preferably has a positive polarity while the pole stud, which is insulated from the metal housing, has a negative polarity.

Preferably, the conductor vanes exiting from the first end face and/or the collecting and positioning means and/or the base of the metal housing and/or the entire metal housing are made from aluminum or an aluminum alloy.

Preferably, in addition to the pole stud which is electrically insulated from the metal housing, the battery can comprise a further pole stud which is guided outward from the inside of the metal housing through a through-hole in the metal housing, in particular in the cover of the metal housing, while at the same time electrically connecting to one of the electrodes via the metal housing and the collecting and positioning means. In this example, the pole stud which is electrically insulated from the metal housing preferably connects to the at least one negative electrode, while the further pole stud electrically connects to the at least one positive electrode via the metal housing and the collecting and positioning means.

An example of this type can be expedient, for example, when a fuse, which can interrupt the electrical contact between the further pole stud and the housing, is integrated in the current path between the further pole stud and the housing. A possible fuse is, in particular, a thermal or pneumatic-mechanical fuse arranged inside the metal housing.

We also provide a method of manufacturing a battery. The method comprises the following steps:
providing an individual cell having at least one positive and at least one negative electrode, which is in the form of a winding which has a first and a second end face, wherein conductor vanes connected to the positive electrode exit from the first end face and conductor vanes connected to the negative electrode exit from the second end face;
arranging a collecting and positioning means on one of the end faces of the winding and fixing the conductor vanes exiting from this end face in or on the collecting and positioning means;
providing a receptacle having a rectangular base and four side elements arranged at a right angle thereto, whereof the free edges form an opening, wherein the base has a receiving means for the collecting and positioning means, in which the latter can be inserted and fixed;
inserting the winding with the end face which is provided with the collecting and positioning means first into the receptacle until the collecting and positioning means reaches the base and is inserted into the receiving means;
fixing the collecting and positioning means in the receiving means; and
closing the opening with a rectangular cover.

Fixing the conductor vanes in or on the collecting and positioning means and fixing the collecting and positioning means in the receiving means preferably takes place by welding, in particular, by a laser.

All of the battery components used within the context of the method have already been explained in connection with the battery. Instead of repeating the explanations, please refer to the corresponding explanations above.

Preferably, in the method, a molded part made from plastics material is placed on the end face provided with the collecting and positioning means prior to the insertion of the cover, which molded part covers the end face completely with the exception of the collecting and positioning means. The molded part is preferably a deep-drawn part made from a plastics foil with a mean thickness of 80 µm to 120 µm. Possible foil materials are, in particular, PPS (polyphenylene sulfide) and PEEK (polyether ether ketone).

Further features and advantages are revealed in the description below of the drawings which are used for illustration. The examples described below merely serve for explanation and better understanding and should in no way be seen as restrictive.

FIG. 1 shows a schematic illustration of a cross-section of the base region of an example of a battery 100. This has a prismatic aluminum housing 101 having the base 102 and four side elements (only the two side elements 103 and 104 are visible in the cross-sectional illustration). An individual cell 105 is arranged in the housing 101. This cell has the form of a winding. A plurality of conductor vanes 107, grouped in the collecting and positioning means 108, exit at the first end face 106 of the winding, which faces the base 102. A molded part 113 made from plastics material is placed on the end face 106, which molded part covers the end face 106 completely with the exception of the collecting and positioning means 108.

The collecting and positioning means 108 is formed as a clamping rail between the clamping limbs 109 and 110 of which the conductor vanes 107 are fixed by welding. A contact element 111 having a through-hole 112 in the center is counter-sunk into the base 102. This through-hole serves as a receiving means for the collecting and positioning means 108 which is inserted into the through-hole 112 and is fixed therein by welding to the contact element 111.

Figure 2:
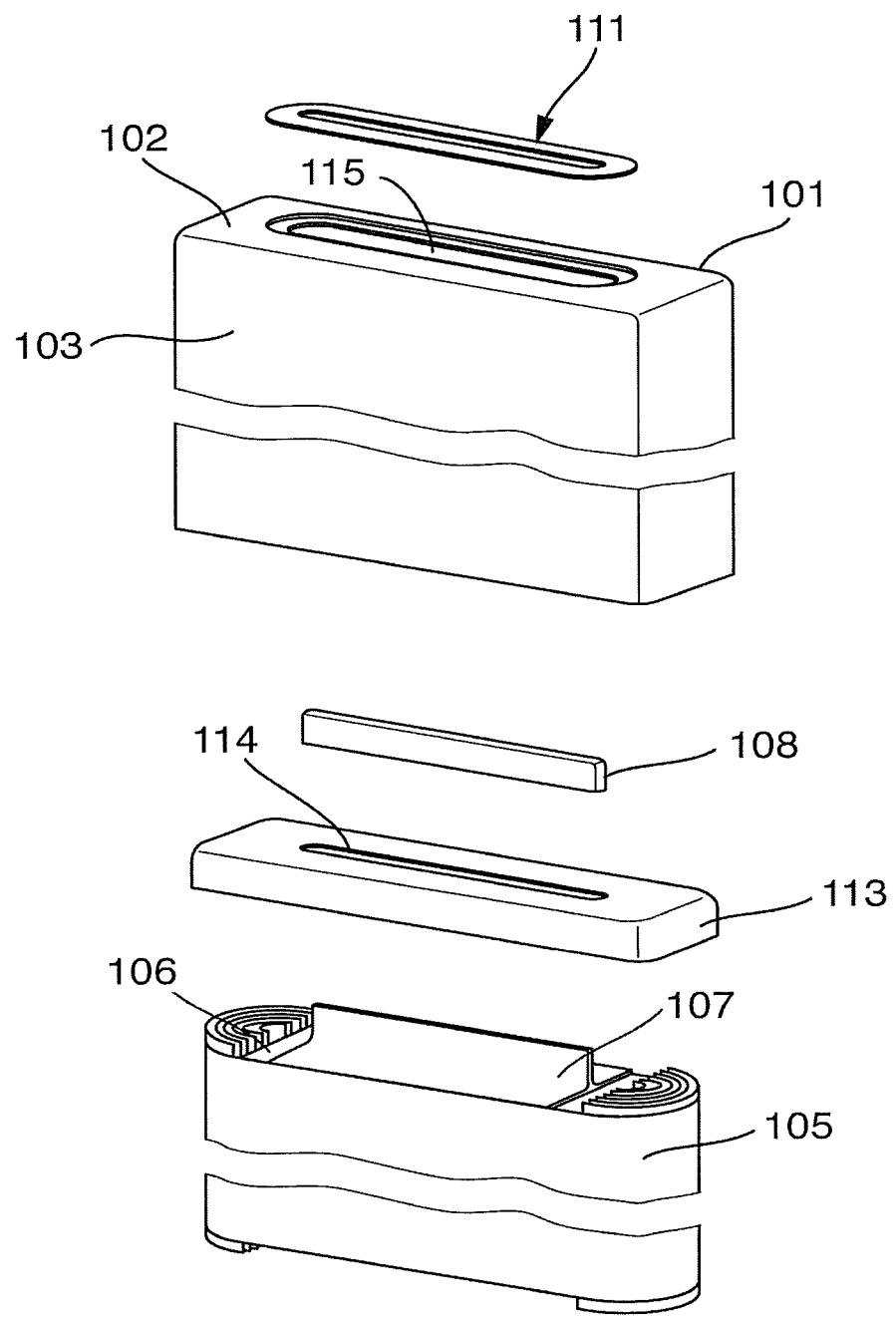
FIG. 2 shows a perspective view of the essential components of the base region illustrated in FIG. 1.

FIG. 2 shows a perspective view of the essential components of the base region illustrated in FIG. 1. This shows the individual cell 105 together with the conductor vanes 107 exiting from the end face 106. These are already folded in the center to be pushed between the limbs of the collecting and positioning means 108 formed as the clamping rail in the next step. The molded part 113 in turn has a through-hole 114 in the center for the clamping rail 108. The prismatic aluminum housing 101 comprises the base 102 having a central recess 115 in which the contact element 111 can be countersunk.

The invention claimed is:
1. A battery comprising:
a prismatic metal housing having a housing inner side and a housing outer side,
at least one individual cell having at least one positive and at least one negative electrode arranged inside the metal housing, and
a pole stud electrically connected to the at least one positive or the at least one negative electrode and electrically insulated from the metal housing and to which an electrical load arranged outside the housing can be connected, wherein the metal housing comprises a rectangular base having a base inner side and a base outer side, a rectangular cover having a cover inner side and a cover outer side, the size and shape of which substantially correspond to that of the base, and four rectangular side elements connecting the base and the cover and each have an inner side and an outer side, the cover has a through-hole through which the pole stud which is electrically insulated from the metal housing is guided outward from the inside of the metal housing, the at least one individual cell is a winding having a first and a second end face and the first end face faces in the direction of the base and the second end face faces in the direction of the cover, conductor vanes electrically connected to the base of the metal housing exit from the first end face, conductor vanes electrically connected to the pole stud, which is electrically insulated from the metal housing, exit from the second end face, the conductor vanes exiting from the second end face are fixed to the pole stud such that one of the at least one positive electrode and the at least one negative electrode arranged inside the metal housing is electrically connected to the pole stud, the conductor vanes exiting from the first end face are fixed to an electrically conductive collecting and positioning means, and the base has a through-hole as a receiving means for the collecting and positioning means, in which the latter is inserted and fixed such that 1) the collecting and positioning means is accessible from outside the metal housing, and 2) one of the at least one positive electrode and the at least one negative electrode arranged inside the metal housing is electrically connected to the metal housing.

2. The battery as claimed in claim 1, wherein the collecting and positioning means is a metal clamping rail in which the conductor vanes are fixed.

3. The battery as claimed in claim 1, wherein the conductor vanes exiting from the first end face connect to the positive electrode and the conductor vanes exiting from the second end face connect to the negative electrode.

4. The battery as claimed in claim 1, wherein the conductor vanes exiting from the first end face and/or the collecting and positioning means and/or the base of the metal housing and/or the entire metal housing are made from aluminum or an aluminum alloy.

5. The battery as claimed in claim 1, further comprising a further pole stud guided outward from the inside of the metal housing through a through-hole in the cover of the metal housing, and electrically connects to one of the electrodes via the metal housing and the collecting and positioning means.

6. A method of manufacturing a battery as claimed in claim 1, comprising:

providing an individual cell having at least one positive and at least one negative electrode in the form of a winding having a first and a second end face, wherein conductor vanes connected to the positive electrode exit from the first end face, conductor vanes connected to the negative electrode exit from the second end face, the conductor vanes exiting from the second end face are fixed to the pole stud such that one of the at least one positive electrode and the at least one negative electrode arranged inside the metal housing is electrically connected to the pole stud, arranging a collecting and positioning means on one of the end faces of the winding and fixing the conductor vanes exiting from this end face in the collecting and positioning means, providing a receptacle having a rectangular base and four side elements arranged at a right angle thereto, whereof the free edges form an opening, wherein the base has a through-hole as a receiving means for the collecting and positioning means, in which the latter can be inserted and fixed such that 1) the collecting and positioning means is accessible from outside the metal housing, and 2) one of the at least one positive electrode and the at least one negative electrode arranged inside the metal housing is electrically connected to the metal housing, inserting the winding with the end face provided with the collecting and positioning means first into the receptacle until the collecting and positioning means reaches the base and is inserted into the receiving means, fixing the collecting and positioning means in the receiving means, and closing the opening with a rectangular cover.

7. The method as claimed in claim 6, wherein a molded part made from plastic material is placed on the end face provided with the collecting and positioning means prior to insertion of the cover, which molded part covers the end face completely with the exception of the collecting and positioning means.

8. The battery as claimed in claim 2, wherein the base has a through-hole as a receiving means for the collecting and positioning means so that the collecting and positioning means is accessible from outside the metal housing.

9. The battery as claimed in claim 2, wherein the conductor vanes exiting from the first end face connect to the positive electrode and the conductor vanes exiting from the second end face connect to the negative electrode.

10. The battery as claimed in claim 1, wherein the conductor vanes exiting from the first end face connect to the positive electrode and the conductor vanes exiting from the second end face connect to the negative electrode.

11. The battery as claimed in claim 2, wherein the conductor vanes exiting from the first end face and/or the collecting and positioning means and/or the base of the metal housing and/or the entire metal housing are made from aluminum or an aluminum alloy.

12. The battery as claimed in claim 1, wherein the conductor vanes exiting from the first end face and/or the collecting and positioning means and/or the base of the metal housing and/or the entire metal housing are made from aluminum or an aluminum alloy.

13. The battery as claimed in claim 3, wherein the conductor vanes exiting from the first end face and/or the collecting and positioning means and/or the base of the metal housing and/or the entire metal housing are made from aluminum or an aluminum alloy.

14. The battery as claimed in claim 2, further comprising a further pole stud guided outward from the inside of the metal housing through a through-hole in the cover of the metal housing, and electrically connects to one of the electrodes via the metal housing and the collecting and positioning means.

15. The battery as claimed in claim 1, further comprising a further pole stud guided outward from the inside of the metal housing through a through-hole in the cover of the metal housing, and electrically connects to one of the electrodes via the metal housing and the collecting and positioning means.

16. The battery as claimed in claim 3, further comprising a further pole stud guided outward from the inside of the metal housing through a through-hole in the cover of the metal housing, and electrically connects to one of the electrodes via the metal housing and the collecting and positioning means.

17. The battery as claimed in claim 4, further comprising a further pole stud guided outward from the inside of the metal housing through a through-hole in the cover of the metal housing, and electrically connects to one of the electrodes via the metal housing and the collecting and positioning means.

18. A battery comprising:
a prismatic metal housing having a housing inner side and a housing outer side,
at least one individual cell having at least one positive and at least one negative electrode arranged inside the metal housing, and
a pole stud electrically connected to the at least one positive or the at least one negative electrode and electrically insulated from the metal housing and to which an electrical load arranged outside the housing can be connected, wherein
the metal housing comprises a rectangular base having a base inner side and a base outer side, a rectangular cover having a cover inner side and a cover outer side, the size and shape of which substantially correspond to that of the base, and four rectangular side elements connecting the base and the cover and each have an inner side and an outer side,
the cover has a through-hole through which the pole stud which is electrically insulated from the metal housing is guided outward from the inside of the metal housing,
the at least one individual cell is a winding having a first and a second end face and the first end face faces in the direction of the base and the second end face faces in the direction of the cover,
conductor vanes electrically connected to the base of the metal housing exit from the first end face, conductor vanes electrically connected to the pole stud, which is electrically insulated from the metal housing, exit from the second end face,
the conductor vanes exiting from the second end face are fixed to the pole stud such that one of the at least one positive electrode and the at least one negative electrode arranged inside the metal housing is electrically connected to the pole stud,
the conductor vanes exiting from the first end face are fixed to an electrically conductive metal clamping rail, and
the base has a through-hole adapted to receive and make accessible from outside the metal housing the metal clamping rail in which the conductor vanes are fixed, and one of the at least one positive electrode and the at least one negative electrode arranged inside the metal housing is electrically connected to the metal housing.

\* \* \* \* \*